United States Patent [19]
Inoue et al.

[11] Patent Number: 5,255,128
[45] Date of Patent: Oct. 19, 1993

[54] APPARATUS FOR DETECTING DIGITAL DATA

[75] Inventors: Hajime Inoue, Tokyo; Takahito Seki; Keiji Kanota, both of Kanagawa, all of Japan

[73] Assignee: Sony Corporation, Tokyo, Japan

[21] Appl. No.: 680,361

[22] Filed: Apr. 4, 1991

[30] Foreign Application Priority Data

Apr. 11, 1990 [JP] Japan ................................ 2-95653

[51] Int. Cl.⁵ .............................................. G11B 5/09
[52] U.S. Cl. ......................... 360/40; 360/46; 360/51
[58] Field of Search ..................... 360/40, 46, 41, 51, 360/65, 67, 39, 24, 36.1, 68, 32; 341/59

[56] References Cited

U.S. PATENT DOCUMENTS

| | | | |
|---|---|---|---|
| 4,517,610 | 5/1985 | Minuhin | 360/46 X |
| 4,979,052 | 12/1990 | Matsuta et al. | 360/40 X |
| 4,984,099 | 1/1991 | Kanota et al. | 360/46 |
| 5,142,421 | 8/1992 | Kahlman et al. | 360/40 |

*Primary Examiner*—Robert J. Pascal
*Assistant Examiner*—Ali Neyzari
*Attorney, Agent, or Firm*—William S. Frommer; Alvin Sinderbrand

[57] ABSTRACT

In an apparatus for detecting input digital data, for example, as derived by analog-to-digital conversion of a reproduced binary signal in analog form; a distributor circuit distributes the input digital data into at least two channels, a processing circuit in each channel processes the respective digital data in accordance with a predetermined formula, a decoder in each channel decodes an output of the respective processing circuit in accordance with the Viterbi algorithm, and the outputs of the decoders are composed or combined to provide therefrom a single sequence of digital data.

24 Claims, 5 Drawing Sheets

FIG. 6A A/D Output

FIG. 6B Data of Even Sequence

FIG. 6C Data of Odd Sequence

FIG. 7A Equalizer Output (Point $e_1$)

FIG. 7B Equalizer Output (Point $e_2$)

FIG. 7C Equalizer Output (Point $e_3$)

FIG. 7D Equalizer Output (Odd Sequence)

FIG. 7E Added Output (Even Sequence)

APPARATUS FOR DETECTING DIGITAL DATA

BACKGROUND OF THE INVENTION

1. Field of the Invention

The present invention generally relates to apparatus for detecting digital data and, more particularly, is directed to an apparatus for detecting digital data for use in a video tape recorder (VTR) which uses Class IV or other partial response signalling in high density digital tape recording and reproducing.

2. Description of the Prior Art

So-called digital video tape recorders have been developed to record a video signal in the form of a digital signal on a magnetic tape and, with such digital VTRs, the deterioration of image quality in the dubbing mode can be suppressed to a minimum.

Incidentally, when a signal is recorded on and/or reproduced from a magnetic tape, the electromagnetic transducing system used therefor, such as, a magnetic head or the like, has a differentiation characteristic so that the C/N (carrier-to-noise) ratio is deteriorated at the lower frequency side. The C/N ratio will be similarly deteriorated due to a magnetization characteristic of the magnetic tape itself, shown in FIG. 1, if the frequency is increased.

Accordingly, when using a magnetic recording and/or reproducing system for a digitized video signal (hereinafter, referred to as a digital video signal), the frequency band in which a satisfactory C/N ratio can be obtained is relatively narrow. For this reason, when a digital video signal is to be detected, a detection system is employed having a signal spectrum concentrated near a region in which the C/N ratio is maximized so as to effectively avoid deterioration of the C/N ratio of the reproduced signal, and thereby ensure that the digital video signal will be recorded and/or reproduced efficiently. In connection with the foregoing, it has been proposed to utilize a class IV partial response scheme in the reproduction and detection of a digital video signal, for example, as disclosed in U.S. Pat. No. 4,504,872, issued Mar. 12, 1985, and in U.S. Pat. No. 4,984,099, issued Jan. 8, 1991, and which has a common assignee herewith.

Figure 2:
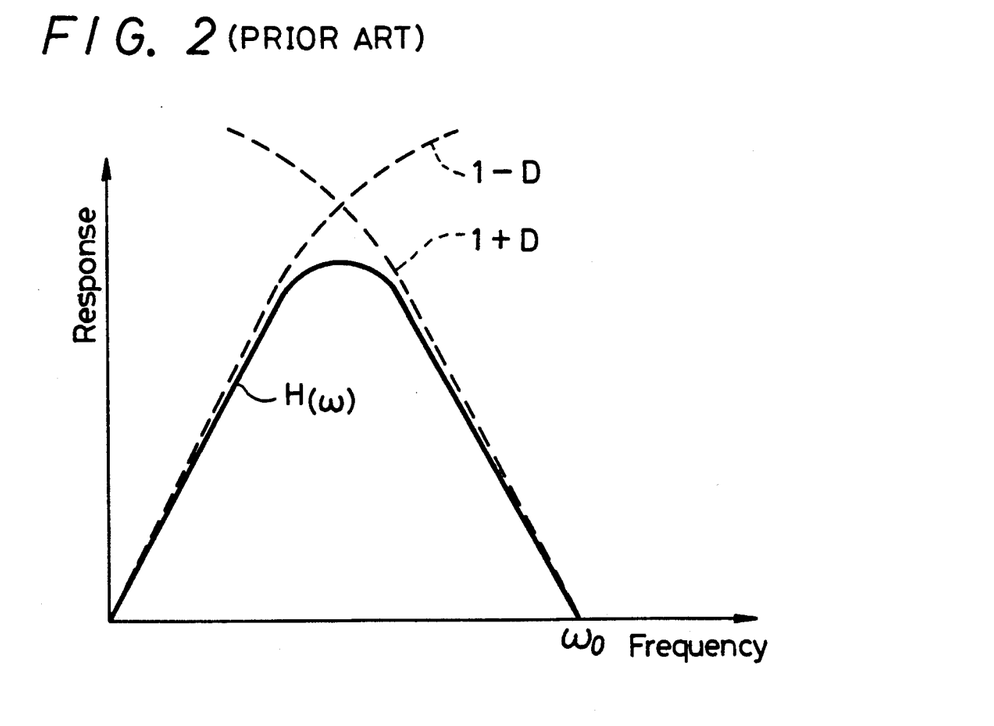

More specifically, since the C/N ratio in a magnetic recording and/or reproducing system is deteriorated at the low and high frequencies, its frequency characteristic can be approximated by a frequency characteristic $H(\omega)$ of a class IV partial response $(1-D^2)$ scheme expressed by using a delay operator D as shown in FIG. 2.

Incidentally, the frequency $\omega_0$ that is, the Nyquist frequency at which the response is minimized, has a relation to the delay time T imposed by the delay operator D as shown by the following equation:

$$\omega_0 = \frac{\pi}{T} \quad (1)$$

Accordingly, if the amount of delay imposed by the delay operator D is selected so that the signal spectrum is concentrated near the region in which the C/N ratio is maximized, then the digital video signal can be recorded and/or reproduced efficiently by effectively utilizing the frequency characteristic of the magnetic recording and/or reproducing system.

In other words, in the recording mode, a calculation process corresponding to the following expression (2) is sequentially performed on the digital video signal:

$$\left[ \frac{1}{1-D^2} \right] \text{MOD2} \quad (2)$$

where MOD2 represents the remainder of 2.

Further, since the electromagnetic transducing system, for example, a magnetic head, has a differentiation characteristic, a reproduced signal from the magnetic head has a characteristic expressed as $(1-D)$ with reference to the delay operator D and which is shown by the correspondingly labeled dashed line in FIG. 2.

Accordingly, in the playback or reproducing mode, a calculation process of $(1+D)$ is performed on the reproduced signal, whereby the correction expressed by the following equation can be executed:

$$(1-D) \cdot (1+D) = 1-D^2 \quad (3)$$

Owing to expression (2) and equation (3), the digital video signal can be reproduced with the transfer function of the recording and reproducing system being maintained at "1".

Figure 1:
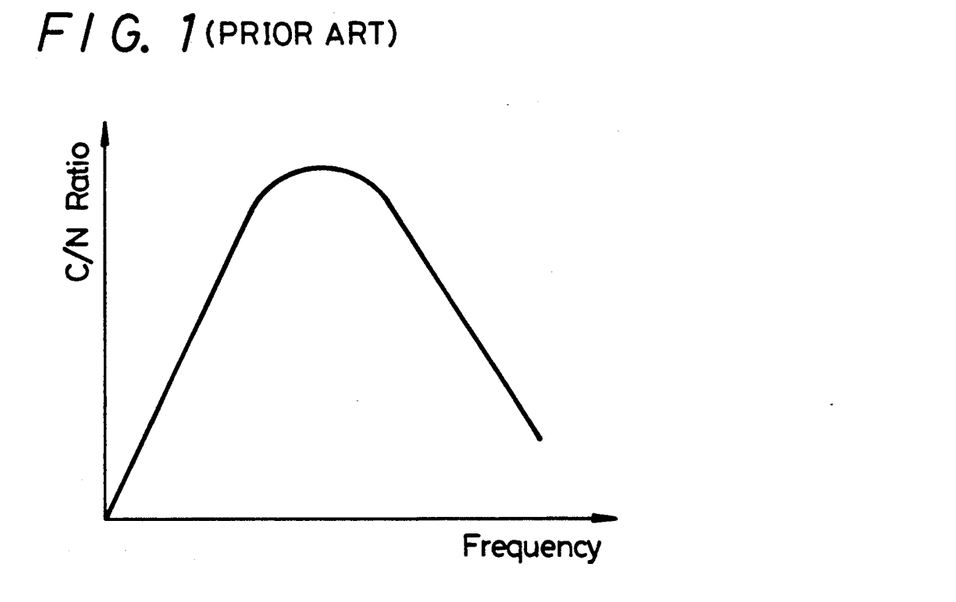
FIGS. 1 and 2 are frequency characteristic graphs to which reference is made in explaining a partial response scheme used in the prior art.

When the digital video signal is recorded and/or reproduced by making effective use of class IV partial response signalling, a digital video signal having a small bit error rate can be reproduced by the application of the Viterbi decoding technique, which indicates that, as shown in FIG. 2, the digital video signal can be efficiently detected by effectively utilizing a frequency characteristic nearly equal to the characteristic of FIG. 1 which represents the frequency characteristic of the magnetic recording and/or reproducing system.

For example, as disclosed in detail in "Analog Viterbi Decoding for High Speed Digital Satellite Channels", A. S. Acampora et al., IEEE Transactions on Communications, Vol. Com. 26, No. 10, October 1978, pages 1463-1470; and in "The Viterbi Algorithm", G. D. Forney, Jr., Proceedings of the IEEE, Vol. 61, No. 3, March 1973, pages 268-278, a Viterbi decoding circuit utilizes likelihood of correlation between data input successively thereto for detecting transit of the data and decodes the data on the basis of the detected result.

Accordingly, if the relationship $(1-D^2)$ of the reproduced signal relative to the signal used for recording (hereinafter referred to as the "recording signal") is utilized to decode the recording signal from the reproduced signal and then the digital video signal is decoded on the basis of the decoded data, the bit error rate of the decoded data can be reduced as compared with a standard decoding circuit which decodes data with reference to the signal level.

A known reproducing circuit of a digital VTR which incorporates class IV partial response and Viterbi decoding schemes will now be described with reference to FIG. 3 in which digital video data recorded as a binary signal in analog form on a video tape 1 is reproduced by a magnetic head 2. The reproduced signal is supplied through an amplifier 3 to an equalizer circuit 4, and the equalized reproduced signal output from the equalizer circuit 4 is supplied to a processing circuit 5. The processing circuit 5 performs on this reproduced signal the calculation $(1+D)$ in accordance with the above-mentioned partial response scheme. A calculated output of the processing circuit 5 is supplied to an analog-to-digital (A/D) converter 6. A reproduced clock is generated from the reproduced signal by a phase-locked loop (PLL) circuit 7 to which the output of the amplifier 3 is supplied. This reproduced clock is supplied to the A/D converter 6 which detects digital data from the reproduced signal level on the basis of the reproduced clock. Detected digital data is supplied to a Viterbi decoder circuit 8, in which the data is decoded in accordance with the Viterbi decoding scheme to detect a digital video signal. The thus detected digital video signal is supplied through an output terminal 9 to a reproduced signal processor circuit (not shown) at a next or succeeding stage.

Figure 3:
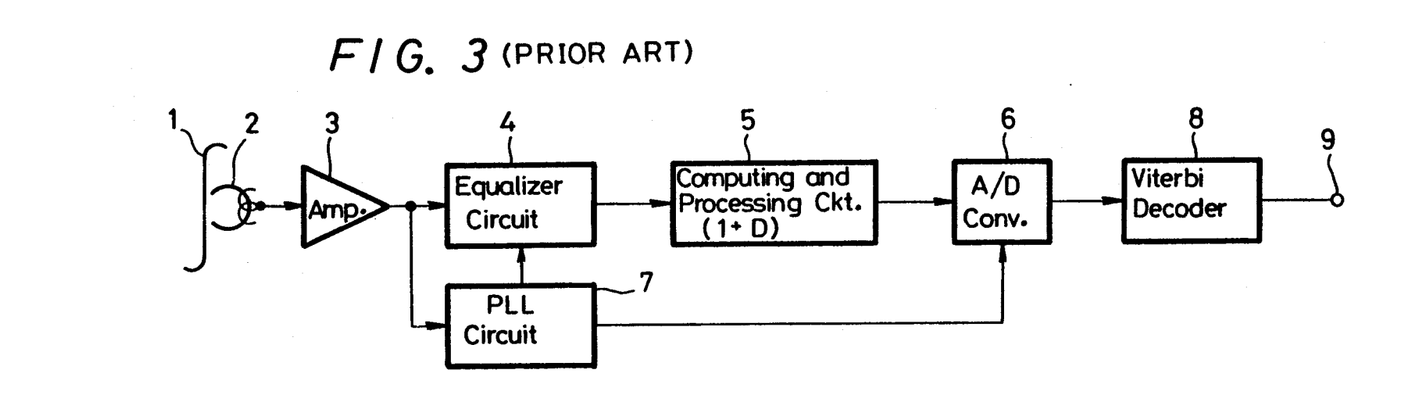
FIG. 3 is a schematic block diagram showing an example of a reproducing circuit of a digital video tape recorder according to the prior art which incorporates a class IV partial response scheme and a Viterbi decoding scheme.

When the digital video signal is reproduced by the known circuit arrangement of FIG. 3, the transmission rate of the digital video data is very high so that the frequency of a clock necessary for processing reproduced data in each of the circuits must be selected to be higher than 300 MHz. The circuits which are operated at such high clock frequency require a calculation circuit of a special configuration, which cannot be readily provided in actual practice. Further, it is preferable that the equalizer circuit 4 and the processing circuit 5 be fabricated as digital circuits because digital equalizer circuits and digital processing circuits can provide excellent characteristics. However, it is very difficult to operate the equalizer circuit 4 and the processing circuit 5 at any clock frequency higher than 30 MHz if these circuits 4 and 5 are in digital form. Therefore, in the circuit according to the prior art shown on FIG. 3, the equalizer and processing circuits 4 and 5 precede the analog-to-digital converter 6 and are not fabricated as digital circuits.

Similarly, in U.S. Pat. No. 4,504,872 referred to above, the analog-to-digital conversion follows passage of the reproduced signal through a $1-D^2$ class IV response filter so that the latter is not fabricated as a digital circuit and, hence, does not realize the advantageous characteristics inherent in digital fabrication.

OBJECTS AND SUMMARY OF THE INVENTION

Accordingly, it is an object of the present invention to provide an improved apparatus for detecting digital data in which the above-mentioned problems and disadvantages encountered with the prior art can be substantially eliminated.

More specifically, it is an object of the present invention to provide an apparatus for detecting digital data in which, when digital data is detected in a digital video tape recorder or the like, a signal processing speed of each of the circuits can be substantially decreased.

It is another object of the present invention to provide an apparatus for detecting digital data in which the circuit arrangement thereof can be simplified so as to be operable by a clock signal of a relatively low frequency.

According to an aspect of the present invention, an apparatus for detecting input digital data is comprised of a distributor circuit for distributing the input digital data into at least two channels, a processing circuit in each of the channels for processing the digital data in the respective channel in accordance with a predetermined formula, a decoder circuit in each of the channels for decoding an output of the processing circuit in the respective channel in accordance with the Viterbi algorithm, and a composing circuit for composing or combining the outputs of the decoder circuits in the channels so as to obtain digital data in one sequence.

In accordance with another aspect of the present invention, an apparatus for reproducing digital data recorded as a binary signal in analog form on a magnetic tape is comprised of a playback circuit for reproducing the binary signal in analog form from the magnetic tape by means of a magnetic head, an A/D converter for converting an output of the playback circuit into digital data, a distributing circuit for distributing the digital data into at least two channels, a processing circuit in each of the channels for processing the digital data in the respective channel in accordance with a class IV partial response, a decoder in each of the channels for decoding an output of the processing circuit in the respective channel in accordance with the Viterbi algorithm, and a composing circuit for composing or combining the outputs of the decoders in the channels so as to obtain digital data in one sequence.

The above, and other objects, features and advantages of the present invention, will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An apparatus for detecting digital data according to an embodiment of the present invention will hereinafter be described with reference to FIGS. 4 and 5, in which parts corresponding to those described with reference to FIG. 3 are identified by the same reference numerals and therefore will not be again described in detail.

In the illustrated embodiment, the invention is shown applied to a reproducing system of a digital video tape recorder in which digital data representing a video signal are recorded as a binary signal in analog form on a magnetic tape. This reproducing system is generally arranged as shown in FIG. 4, and in which the signal reproduced from the magnetic tape 1 by the magnetic head 2 is supplied through the playback amplifier 3 to the A/D converter 6, and digital data is derived from the reproduced signal by this A/D converter 6 on the basis of the reproduced clock signal supplied thereto from the PLL circuit 7.

Digital data output from the A/D converter 6 are divided into an odd sequence and an even sequence which are then supplied to respective channels containing equalizer circuits 11 and 12, respectively. In this embodiment, each of the equalizer circuits 11 and 12 is formed of a transversal filter. Outputs of the equalizer circuits 11 and 12 are supplied to processing circuits 21 and 22 in the respective channels which perform the (1+D) calculation on the outputs of the equalizer circuits 11 and 12, respectively, where D is a delay operator. In the embodiment being described, the processing circuit 21 derives the thus processed data for the odd sequence and the processing circuit 22 derives the thus processed data for the even sequence.

Outputs of the processing circuits 21 and 22 are supplied to Viterbi decoders 23 and 24, in the respective channels. The Viterbi decoder 23 is operable to Viterbi-decode data of the odd sequence and the Viterbi decoder 24 is operative Viterbi-decode data of the even sequence. Outputs of the two Viterbi decoders 23 and 24 are supplied to a change-over switch 25. The change-over or composing switch 25 alternately switches the outputs for the odd sequence and the even sequence from the Viterbi decoders 23 and 24 to compose them into data of one sequence, and supplies this data of one sequence to an output terminal 26. Data developed at the output terminal 26 are supplied to a reproduced signal processing circuit (not shown) forming a succeeding stage.

A specific circuit arrangement extending from the A/D converter 6 through the processing circuits 21 and 22 will now be described with reference to FIGS. 5A and 5B which together constitute FIG. 5.

Figure 4:
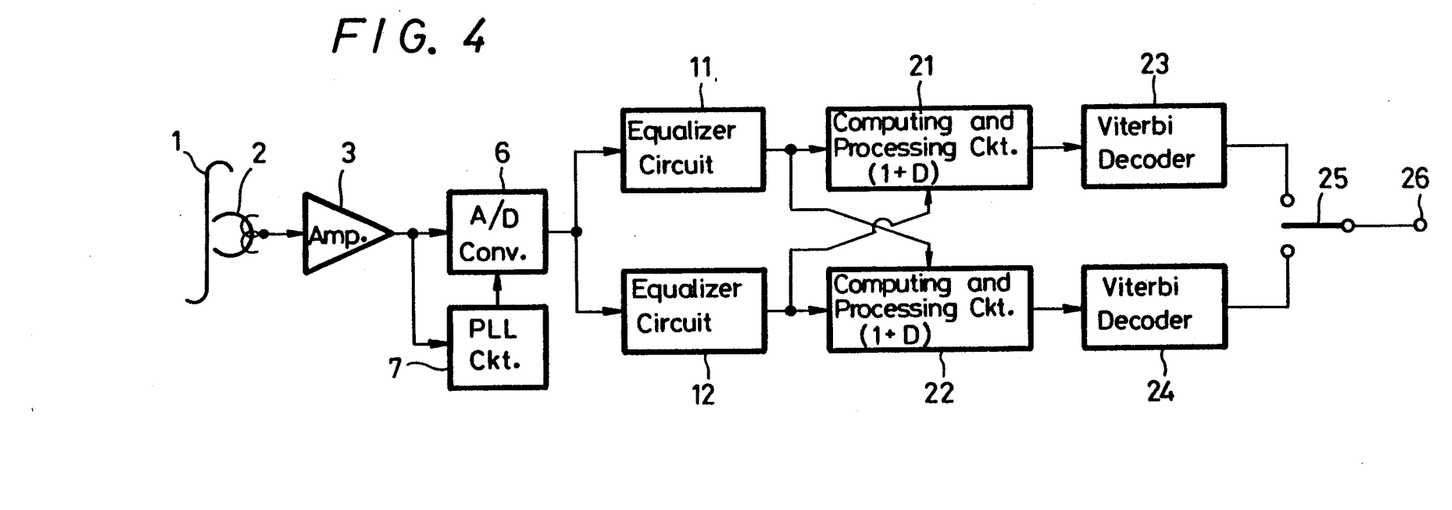
FIG. 4 is a schematic block diagram showing an apparatus for detecting digital data according to an embodiment of the present invention.
Figures 5, 5A:
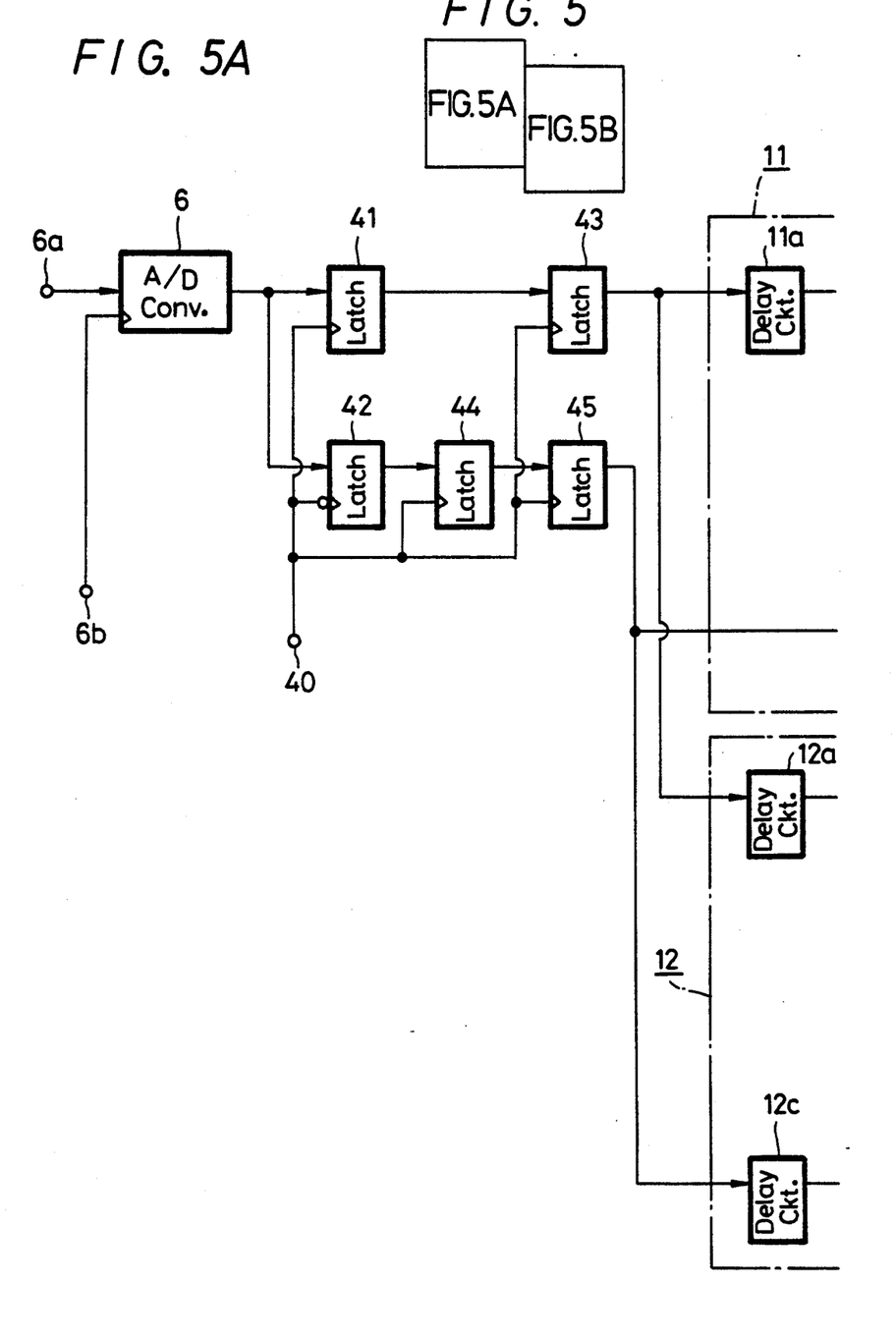
FIG. 5. (Formed of FIGS. 5A and 5B) is a schematic block diagram showing a specific example of a main portion of the embodiment of the present invention shown in FIG. 4.
Figure 5B:
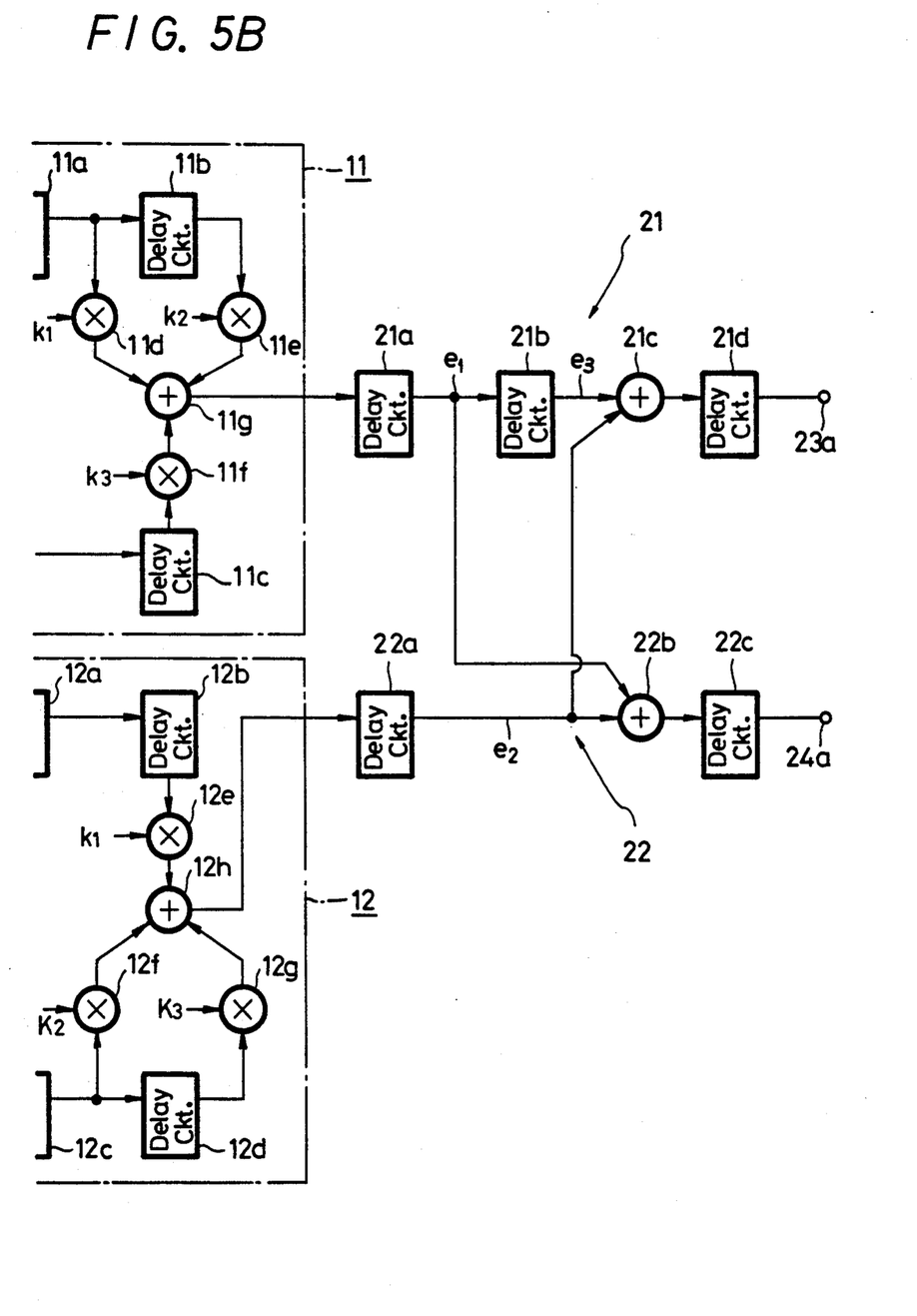

In the arrangement of FIG. 5, the A/D converter 6 detects digital data from the level of a reproduced signal developed at a terminal 6a on the basis of a reproduced clock signal supplied thereto through a terminal 6b from the PLL circuit 7 (FIG. 4). The frequency of the reproduced clock signal supplied to the terminal 6b is selected to be 40 MHz.

The output digital data from the A/D converter 6 are supplied to a distributor which includes latch circuits 41 and 42. The latch circuits 41 and 42 latch the digital data on the basis of a clock signal having a frequency of 20 MHz and which is supplied thereto through a terminal 40. The clock signal supplied to the latch circuit 41 and the clock signal supplied to the latch circuit 42 are inverted in phase relative to each other by 180 degrees, so that the latch timings of the latch circuits 41 and 42 are displaced from each other, whereby data of an even sequence is latched by the latch circuit 41 and data of an odd sequence is latched by the latch circuit 42.

Data latched by the latch circuit 41 is supplied through a latch circuit 43 functioning as a delay circuit to the equalizer circuits 11 and 12, and data latched by the latch circuit 42 is supplied through latch circuits 44 and 45 arranged in series and also functioning as delay circuits to the equalizer circuits 11 and 12. The 20 MHz clock signal applied to the terminal 40 is also supplied to the latch circuits 43, 44 and 45, so that data are delayed by one clock in each of the latch circuits 43, 44 and 45.

In the equalizer circuit 11, output data from the latch circuit 43 is supplied to a series circuit of delay circuits 11a and 11b and output data from the latch circuit 45 is supplied to a delay circuit 11c. Outputs of the delay circuits 11a, 11b and 11c are supplied through coefficient multipliers 11d, 11e and 11f, respectively, to an adder 11g. In the equalizer circuit 12, output data from the latch circuit 43 is supplied to a series circuit of delay circuits 12a and 12b, and output data from the latch circuit 45 is supplied to a series circuit of delay circuits 12c and 12d. Outputs of the delay circuits 12b, 12c and 12d are supplied through coefficient multipliers 12e, 12f, 12g, respectively, to an adder 12h. The coefficient multipliers 11d, 11e and 11f and the coefficient multipliers 12e, 12f and 12g are operative to multiply the respective delayed data supplied thereto by coefficients $K_1$, $K_2$ and $K_3$, respectively.

Thus, the two equalizer circuits 11 and 12 constitute respective transversal filters and the adders 11g and 12h provide equalized signals, respectively. By adjusting coefficients k1, k2 and k3 employed in the coefficient multipliers 11d, 11e and 11f, and in the coefficient multipliers 12e, 12f and 12g of the equalizer circuits 11 and 12, the equalizing level is changed. Each of the delay circuits 11a, 11b, 11c, 12a, 12b, 12c and 12d is formed of a latch circuit which delays an input signal by a delay time of one clock having the frequency of 20 MHz.

Outputs of the equalizer circuits 11 and 12 are supplied to the processing circuit 21 which performs the (1+D) calculation so as to obtain the processed data of the odd sequence. More specifically, the output data of the equalizer circuit 11 is supplied through a series circuit of delay circuits 21a and 21b to one input terminal of an adder 21c, and the output of the equalizer 12 is supplied through a delay circuit 22a to the other input terminal of the adder 21c. An added or sum output of the adder 21c is supplied through a delay circuit 21d to an input terminal 23a of the Viterbi decoder circuit 23 in the respective channel. In other words, the output of the delay circuit 21d is supplied to the Viterbi decoder circuit 23 which Viterbi-decodes the data of the odd sequence constituting the output of the processing circuit 21.

The outputs of the equalizer circuits 11 and 12 are also supplied to the processing circuit 22 which perform the (1+D) calculation so as to obtain the processed data of the even sequence. More specifically, an output of the delay circuit 21a in the odd sequence data processing circuit 21 is supplied to one input terminal of an adder 22b, and an output of the delay circuit 22a is supplied to the other input terminal of the adder 22b. An added or sum output of the adder 22b is supplied through a delay circuit 22c to an input terminal 24a of the Viterbi decoder circuit 24. In other words, the output of the delay circuit 22c is supplied to the Viterbi decoder circuit 24 which Viterbi-decodes the data of the even sequence constituting the output of the processing circuit 22.

Incidentally, each of the delay circuits 21a, 21b and 21d, and each of the delay circuits 22a and 22c in the processing circuits 21 and 22 respectively, is formed of a latch circuit which delays the input signal input thereto by a delay time of one clock period of the clock signal having a frequency of 20 MHz.

Operation of the above embodiment of the invention will now be described with reference to FIGS. 6A through 6C and FIGS. 7A through 7E.

Figure 6A:
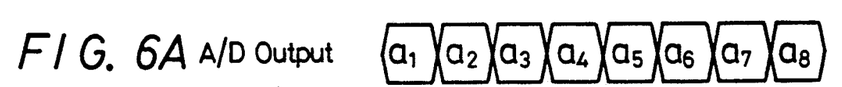
FIGS. 6A through 6C and FIGS. 7A through 7E are timing charts to which reference is made in explaining operation of the embodiment of the present invention shown on FIGS. 4 and 5.
Figure 6B:
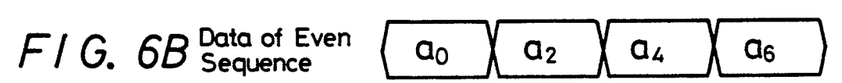
Figure 6C:
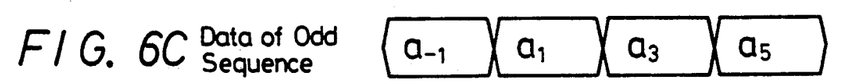

If it is assumed that digital data $a_1$, $a_2$, $a_3$, . . . are output with a sampling frequency of 40 MHz from the A/D converter 6, as shown on FIG. 6A, then such digital data will be divided into data $a_0$, $a_2$, $a_4$ . . . , of even sequence (FIG. 6B) and data $a_{-1}$, $a_1$, $a_3$, . . . of odd sequence (FIG. 6C). The data shown in FIG. 6B represents the output of the latch circuit 43 and the data shown in FIG. 6C represents the output of the latch circuit 44. Since the digital data are divided into the data of the even sequence and the data of the odd sequence, as described above, the sampling frequency of the data of the even or odd sequence becomes 20 MHz which is one-half the sampling frequency of 40 MHz of the original data. Further, by delaying the data of the odd sequence by the latch circuit 44, the data of the even sequence and the data of the odd sequence are synchronized with each other.

Figure 7A:
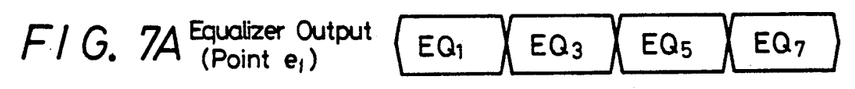
Figure 7B:
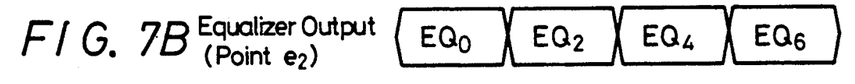
Figure 7C:
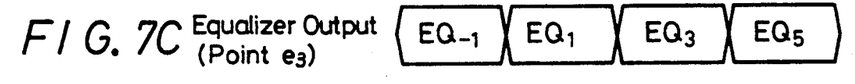

The data of the even sequence and the data of the odd sequence divided from each other are then supplied to the transversal filter or equalizer circuits 11 and 12, respectively, thereby generating equalized data EQ which are separately equalized for the odd and even sequences. More specifically, assuming that data $EQ_1$, $EQ_3$, $EQ_5$, ... obtained at a junction or point $e_1$ corresponding to the output of the delay circuit 21a, are considered the output of the equalizer circuit 11, as shown in FIG. 7A, then data $EQ_0$, $EQ_2$, $EQ_4$, ... are obtained at a point $e_2$, corresponding to the output of the delay circuit 22a at the same timing, and may be considered the output of the equalizer circuit 12, as shown in FIG. 7B. Further, at the same timing, as shown in FIG. 7C, data $EQ_{-1}$, $EQ_1$, $EQ_3$, ... will be obtained at a point $e_3$ corresponding to the output of the delay circuit 21b.

Figure 7D:
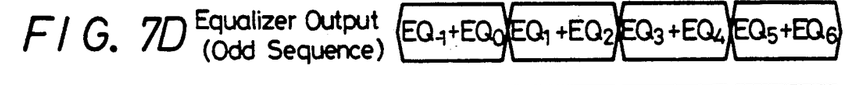

The added or sum output of the adder 21c in the processing circuit 21 is simply the sum of the signals at the points $e_2$ and $e_3$, and hence becomes the data $EQ_{-1}+EQ_0$, $EQ_1+EQ_2$, $EQ_3+EQ_4$, ... as shown in FIG. 7D. This added output is supplied to the Viterbi decoder circuit 23 which decodes the data of the odd sequence as the data processed by $(1+D)$.

Figure 7E:
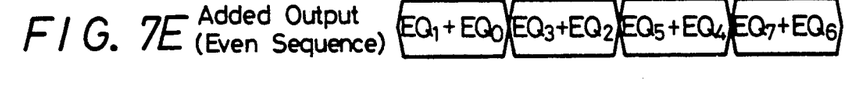

Similarly, the added or sum output of the adder 22b in the processing circuit 22 is simply the sum of the signals at the points $e_1$ and $e_2$, and hence becomes the data $EQ_1+EQ_0$, $EQ_3+EQ_2$, $EQ_5+EQ_4$, ... as shown in FIG. 7E. This added output is supplied to the Viterbi decoder circuit 24 which decodes the data of the even sequence as the data processed by $(1+D)$.

The data of the odd sequence and the data of the even sequence are separately decoded by the two Viterbi decoder circuits 23 and 24 and then composed into data of one sequence by operation of the switch 25.

It will be seen that, in the data detecting circuit according to this embodiment of the invention, the reproduced signal is converted into digital data by the A/D converter 6 before being equalized so that the transversal filter or equalizing circuits 11 and 12 and the processing circuits 21 and 22, each of which performs the calculation of $(1+D)$, can be fabricated as digital circuits. Accordingly, the digital equalizing circuits 11 and 12 and the digital processing circuits 21 and 22 can be provided with stable characteristics which can be adjusted with ease. Further, since the equalizer circuits 11 and 12 and the processing circuits 21 and 22 are arranged in respective channels to divide the data into data of an odd sequence and data of an even sequence, the digital signal having a sampling frequency of 40 MHz is equalized using a clock frequency which is one-half the sampling frequency, that is, a clock frequency of 20 MHz, and the $(1+D)$ calculation or processing is also performed with such reduced frequency. Therefore, a simplified digital data detecting circuit which is operable by a clock of relatively low frequency can be employed, that is, there is no need to provide a special circuit which is operated by a clock signal of high frequency.

While the reproduced data is divided into data of 2 channels, that is, data of an odd sequence and data of an even sequence, in the above described embodiment of the invention, it will be appreciated that the reproduced data may be divided into data of 3 or more channels to thereby further lower the clock frequency.

Although, the present invention is described above as being applied to the reproducing circuit of a digital VTR, the present invention is not limited thereto and may be applied to a variety of digital devices.

Since the above described digital data detecting apparatus employing the partial response scheme and the Viterbi decoding system can be incorporated in a simple circuit operated by a clock signal of relative low frequency, it will be apparent that the digital data detecting apparatus embodying the present invention can be applied to a consumer digital VTR which, of necessity, is limited in cost.

Having specifically described a preferred embodiment of the invention with reference to the accompanying drawings, it is to be understood that the invention is not limited to that precise embodiment, and that various changes and modifications could be effected therein by one skilled in the art without departing from the spirit or scope of the invention as defined in the appended claims.

What is claimed is:

1. An apparatus for detecting input digital data comprising:
    distributing means for distributing said input digital data into at least two channels; said distributing means being operative to distribute a first group of said input digital data including less than all of said input digital data into a first one of said channels, and to distribute a second group of said input digital data including less than all of said input digital data and including data outside said first group into a second one of said channels;
    processing means in each of said channels for processing said digital data in the respective channel in accordance with a predetermined formula;
    decoder means in each of said channels for decoding an output of said processing means in said respective channel in accordance with the Viterbi algorithm; and
    means for composing outputs of said decoder means in said channels to obtain digital data in one sequence.

2. An apparatus for detecting input digital data according to claim 1; wherein said predetermined formula is derived from a partial response detection scheme.

3. An apparatus for detecting input digital data according to claim 2; wherein said partial response detection scheme is a class IV partial response scheme.

4. An apparatus for detecting input digital data according to claim 3; further comprising means for deriving said input digital data from a binary signal of analog form reproduced from a magnetic tape by a magnetic head; and wherein said predetermined formula is $(1+D)$ in which D is a delay operator.

5. An apparatus for detecting input digital data according to claim 4; wherein said distributing means is operative to distribute said input digital data into said channels in a predetermined order having a repeated cycle.

6. An apparatus for detecting input digital data, comprising:
    means for deriving said input digital data from a binary signal of analog form reproduced from a magnetic tape by a magnetic head;

distributing means for distributing odd numbered ones of said input digital data into a first channel and even numbered ones of said input digital data into a second channel;

processing means in each of said channels for processing the digital data in the respective channel in accordance with a predetermined formula of (1+D) in which D is a delay operator, said predetermined formula being derived from a class IV partial response scheme;

decoder means in each of said channels for decoding an output of said processing means in said respective channel in accordance with the Viterbi algorithm; and means for composing outputs of said decoder means in said channels to obtain digital data in one sequence.

7. An apparatus for detecting input digital data according to claim 6; wherein said means for deriving said input digital data from said reproduced binary signal of analog form includes analog-to-digital converting means having a predetermined sampling frequency; and wherein said distributing means includes first and second latch means for receiving said input digital data from said converting means, means for providing a latching signal to said first latch means with a frequency which is one-half said sampling frequency, means for inverting said latching signal and applying the inverted latching signal to said second latch means so that said first and second latch means latch odd and even numbered sequences, respectively, of said input digital data, and third latch means in series with said second latch means for synchronizing sequences of digital data applied through said first and third latch means to said one channel and to said other channel in response to said latching signal.

8. An apparatus for detecting input digital data according to claim 1; further comprising means for reproducing a binary signal recorded in analog form on a magnetic tape, and analog-to-digital converting means for deriving said input digital data from the reproduced binary signal in analog form in advance of said distributing means.

9. An apparatus for detecting input digital data according to claim 8,; further comprising equalizer means constituting a transversal filter in each of said channels between said distributing means and the processing means in the respective channel.

10. An apparatus for detecting input digital data according to claim 9; wherein said analog-to-digital converting means has a predetermined sampling frequency; and wherein said equalizer means and said processing means in each of said channels is operable by a clock having a frequency which is a fraction of said sampling frequency.

11. An apparatus for detecting digital data from a binary signal recorded in analog form on a magnetic tape comprising:

playback means including a magnetic head for reproducing said signal recorded on said magnetic tape;

analog-to-digital converter means for converting an output of said playback means into digital data;

distributing means for distributing said digital data from said converter means into at least two channels; said distributing means being operative to distribute a first group of said input digital data including less than all of said input digital data into a first one of said channels, and to distribute a second group of said input digital data including less than all of said input digital data and including data outside said first group into a second one of said channels;

processing means in each of said channels for processing said digital data in the respective one of said channels in accordance with a class IV partial response scheme;

decoder means in each of said channels for decoding an output of said processing means in the respective channel in accordance with the Viterbi algorithm; and means for composing the outputs of said decoder means in said channels to obtain digital data in one sequence.

12. An apparatus for detecting digital data from a binary signal recorded in analog form on a magnetic tape comprising:

playback means including a magnetic head for reproducing said signal recorded on said magnetic tape;

analog-to-digital converter means for converting an output of said playback means into digital data;

distributing means for distributing odd numbered ones of said digital data from said converter means into one of said channels and even numbered ones of said digital data from said converter means into another of said channels;

processing means in each of said channels for processing said digital data in a respective one of said channels in accordance with a class IV partial response scheme;

decoder means in each of said channels for decoding an output of said processing means in the respective channel in accordance with the Viterbi algorithm; and means for composing the outputs of said decoder means in said channels to obtain digital data in one sequence.

13. An apparatus according to claim 12; further comprising equalizer means functioning as a transversal filter in each of said channels between said distributing means and the processing means in the respective channel.

14. An apparatus according to claim 13; wherein said analog-to-digital converting means has a predetermined sampling frequency; and wherein said equalizer means and said processing means in each of said channels is operable by a clock having a frequency which in one-half of said sampling frequency.

15. An apparatus for detecting input digital data according to claim 1, wherein the distributing means is operative to exclude data within said first group from said second group.

16. An apparatus for detecting input digital data according to claim 15, wherein the distributing means is operative to exclude data within said second group from said first group.

17. An apparatus for detecting input digital data according to claim 16, wherein said distributing means is operative to distribute odd numbered ones of said input digital data as said first group into said first one of said channels and even numbered ones of said input digital data as said second group into said second one of said channels.

18. An apparatus accordingly to claim 11, wherein the distributing means is operative to exclude data within said first group from said second group.

19. An apparatus accordingly to claim 18, wherein the distributing means is operative to exclude data within said second group from said first group.

20. A method for processing input digital data, comprising the steps of:
    distributing a first group of said input digital data including less than all of said input digital data into a first one of a plurality of channels;
    distributing a second group of said input digital data including less than all of said input digital data and including data outside said first group into a second one of said plurality of channels;
    processing said digital data in each channel in accordance with a predetermined formula to yield processed digital data;
    decoding the process digital data in each channel in accordance with the Viterbi algorithm; and
    combining the decoded digital data from each channel to obtain a single sequence of digital data.

21. The method of claim 20, wherein the step of distributing said second group comprises excluding data within said first group from said second group.

22. The method of claim 21, wherine the step of distributing said first group comprises excluding data within said second group from said first group.

23. The method of claim 22, wherein the step of distributing said first group of data comprises distributing odd numbered ones of said input digital data into said first one of said channels; and the step of distributing said second group of data comprises distributing even numbered ones of said input digital data into said second one of said plurality of channels.

24. The method of claim 20, further comprising the steps of reproducing a binary signal recorded in analog form on a magnetic tape and converting said reproduced binary signal into said input digital data.

* * * * *